United States Patent
Thompson et al.

(10) Patent No.: US 12,221,042 B2
(45) Date of Patent: Feb. 11, 2025

(54) POWER DISTRIBUTION BOX WITH A WAKE-UP CIRCUIT

(71) Applicant: Sumitomo Wiring Systems, Ltd., Yokkaichi (JP)

(72) Inventors: Jessica L. Thompson, Farmington Hills, MI (US); Robert Grooms, Farmington Hills, MI (US); Vibhor Singh, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 134 days.

(21) Appl. No.: 18/303,904

(22) Filed: Apr. 20, 2023

(65) Prior Publication Data

US 2024/0351536 A1    Oct. 24, 2024

(51) Int. Cl.
  *B60R 16/023*  (2006.01)
  *B60R 16/033*  (2006.01)
  *H02G 3/08*    (2006.01)

(52) U.S. Cl.
  CPC ........ *B60R 16/0238* (2013.01); *B60R 16/033* (2013.01); *H02G 3/08* (2013.01)

(58) Field of Classification Search
  CPC ...... B60R 16/0238; B60R 16/033; H02G 3/08
  See application file for complete search history.

(56) References Cited

U.S. PATENT DOCUMENTS

| | | |
|---|---|---|
| 11,247,582 B2 | 2/2022 | Hofer |
| 2020/0317085 A1* | 10/2020 | Hofer ...................... B60L 50/66 |
| 2023/0010616 A1* | 1/2023 | Gschwantner .......... B60L 58/20 |

FOREIGN PATENT DOCUMENTS

| | | |
|---|---|---|
| CN | 108227576 A | 6/2018 |
| CN | 210707274 U | 6/2020 |
| CN | 114884179 A | 8/2022 |
| DE | 102020206440 A1 | 11/2021 |

* cited by examiner

*Primary Examiner* — Jared Fureman
*Assistant Examiner* — Duc M Pham
(74) *Attorney, Agent, or Firm* — Honigman LLP

(57) ABSTRACT

A power distribution box having a wake-up circuit for causing a system basis chip to transmit a wake-up signal to wake up a microcontroller is provided. The wake-up circuit combines an input from actuating two different electric devices, the wake-up circuit includes a first conversion unit and a second conversion unit. The first conversion unit is interposed between a first source input and a first input, the first conversion unit configured to process the pulsed signal and ground the voltage potential for a period of time, changing the potential of the system basis chip to wake up the system basis chip. The second conversion unit is interposed between the second source input and the first input and is configured to process the signal to ground the potential of the system basis chip, changing the potential of the system basis chip to wake up the system basis chip.

20 Claims, 4 Drawing Sheets

POWER DISTRIBUTION BOX WITH A WAKE-UP CIRCUIT

TECHNICAL FIELD

This disclosure relates to a wake-up circuit for waking up a system basis chip and, in particular, a power distribution box with a wake-up circuit.

BACKGROUND

With reference now to FIG. 1, a schematic diagram of a power distribution box 500 is provided. The power distribution box 500 is configured to supply power from a battery 502 to various electric devices 504, 506. In one aspect, the power distribution box 500 is disposed in an automotive vehicle. The power distribution box 500 supplies power from the battery 502 to a first electric device 504 or a second electric device 506 of the vehicle.

The power distribution box 500 includes a system basis chip 508 programmed with various functions for controlling and powering predetermined electric devices. The power distribution box 500 includes a microcontroller 510 for assisting in the regulation of power outputted by the power distribution box 500. The microcontroller 510 is configured to enter a sleep state after a predetermined period of inactivity. During the sleep state, the microcontroller 510 is inactive.

The system basis chip 508 is configured to transmit a wake-up signal to the microcontroller 510 to wake up the microcontroller 510. The system basis chip 508 includes three inputs 508a, 508b, 508c for receiving a signal to wake up the microcontroller 510 from a sleep state. Currently, one of the inputs 508a is configured to provide a signal to power the first electric device 504, another of the inputs 508b is configured to provide a signal to the second electric device 506 and the third input 508c is coupled to a Controller Area Network (CAN). A signal from the first input 508a or the second input 508b is processed by the system basis chip 508 to transmit the wake-up signal to wake up the microcontroller 510 from a sleep state. Likewise, a message from the CAN line will wake up the microcontroller 510 from a sleep state.

As such, there are currently only three options for waking up the microcontroller by the system basis chip. Accordingly, it remains desirable to have a power distribution box having at least four ways of waking up the microcontroller.

SUMMARY

In one aspect, a wake-up circuit is provided. The wake-up circuit is disposed in a power distribution box. The power distribution box may be configured to supply power from a battery to a first electric device and a second electric device. The power distribution box includes a system basis chip and a microcontroller. The microcontroller is configured to enter a sleep state after a predetermined period of inactivity. The system basis chip includes a first input, a second input, and a third input and is configured to transmit a wake-up signal to wake up the microcontroller from a sleep state. The system basis chip has a voltage potential, wherein the system basis chip sends the wake-up signal to the microcontroller when a change in the voltage potential of the system basis chip occurs.

The wake-up circuit includes a first source input and a second source input. The first source input is also connected to the first input of the system basis chip so as to transmit a pulsed signal to the first input. The second source input is connected to the second electric device and is configured to transmit a signal to the first input of the system basis chip.

The wake-up circuit further includes a first conversion unit and a second conversion unit. The first conversion unit is interposed between the first source input and the first input. The first conversion unit is configured to process the pulsed signal from the first electric device to ground the potential of the system basis chip, changing the potential of the system basis chip and causing the system basis chip to transmit the wake-up signal to wake up the microcontroller.

The second conversion unit is interposed between the second source input and the first input. The second conversion unit is configured to process the signal from the second electric device to ground the potential of the system basis chip, changing the voltage potential of the system basis chip wherein the system basis chip transmits the wake-up signal.

In one aspect of the wake-up circuit, the first conversion unit is connected to the second conversion unit at a first node.

In another aspect, the wake-up circuit may further include a state determination circuit configured to determine if the first electric device is stuck in an ON position. The state determination circuit is further configured to change the potential of the system basis chip by transmitting a pulse when the first electric device is stuck in the ON position.

In another aspect, the first conversion unit may include a first transistor, a first capacitor, a second transistor, and a second capacitor. The first transistor is interposed between the first source input and the first input. The first conversion unit is configured to process the pulsed signal from the first electric device via the first source input to turn on the second transistor and ground the voltage potential of the battery for a period of time defined by a discharge rate of the second capacitor.

The first capacitor is charged by the pulsed signal and turns off the second transistor sending the voltage potential of the system basis chip to ground for the same period of time wherein the system basis chip transmits the wake-up signal. The first conversion unit further includes a first voltage divider and a second voltage divider. The first voltage divider is disposed on a second node and the second voltage divider is disposed on a third node. The second node is interposed between the first source input and the first transistor and the third node is interposed between the first transistor and the first input.

In another aspect, the second conversion unit may include a third transistor interposed between the second source input and the first node. In such an aspect, the second conversion unit further includes a third voltage divider interposed between the second source input and the third transistor and a third capacitor is disposed in parallel with the third transistor and the third voltage divider.

In yet another aspect, the state determination circuit may further include a fourth transistor connected in parallel with the first conversion unit and the second conversion unit disposed at a fourth node, wherein a base of the fourth transistor is connected to the third node. In such an aspect, the fourth transistor brings the potential of the system basis chip to ground so as to allow the battery to charge the third capacitor.

A power distribution box is also provided. The power distribution box is disposed in an automotive vehicle having a first electric device and a second electric device electrically coupled to a battery. The power distribution box includes a microcontroller configured to go to sleep after a predetermined period of inactivity and a system basis chip configured to transmit a wake-up signal to wake up the microcontroller. The system basis chip includes a first input, a second input, and a third input. The system basis chip includes a voltage potential, and is configured to transmit the wake-up signal when the voltage potential changes.

The power distribution box further includes a wake-up circuit. The wake-up circuit includes a first source input, a second source input, a first conversion unit, and a second conversion unit. The first source input is configured to receive a pulsed signal and transmit the pulsed signal to the first input. The second source input is configured to receive a signal and transmit the signal to the first input.

The first conversion unit is interposed between the first source input and the first input. The first conversion unit is configured to process the pulsed signal and ground the voltage potential of the system basis chip, wherein the system basis chip transmits the wake-up signal and the voltage potential is grounded for a period of time defined by a discharge rate of a first capacitor. The second conversion unit is interposed between the second source input and the first input. The second conversion unit is configured to process the signal to ground the voltage potential, wherein the system basis chip transmits the wake-up signal to the microcontroller.

In one aspect of the power distribution box, the first conversion unit is connected to the second conversion unit at a first node.

In another aspect, the power distribution box set may further include a state determination circuit configured to determine if the first electric device is stuck in an ON position. The state determination circuit may be further configured to wake up the system basis chip by transmitting a pulse when the first electric device is stuck in the ON position.

In another aspect of the power distribution box, the first conversion unit may include a first transistor, a first capacitor, a second transistor, and a second capacitor. The first transistor is interposed between the first source input and the first input. The first conversion unit is configured to process the pulsed signal from the first electric device via the first source input to turn on the first transistor and ground the voltage potential of the battery for a period of time defined by a discharge rate of the second capacitor. The first capacitor is charged by the pulsed signal and turns off the second transistor sending the voltage potential of the system basis chip to ground for the same period of time wherein the system basis chip transmits the wake-up signal. The first conversion unit further includes a first voltage divider and a second voltage divider. The first voltage divider is disposed on a second node, and the second voltage divider is disposed on a third node. The second node is interposed between the first source input and the first transistor and the third node is interposed between the first transistor and the first input.

In another aspect of the power distribution box, the second conversion unit may include a third transistor interposed between the second source input and the first node. In such an aspect, the second conversion unit further includes a third voltage divider interposed between the second source input and the third transistor and a third capacitor is disposed in parallel with the third transistor and the third voltage divider.

In yet another aspect of the power distribution box, the state determination circuit may further include a fourth transistor connected in parallel with the first conversion unit and the second conversion unit disposed at a fourth node, wherein a base of the fourth transistor is connected to the third node. In such an aspect, the fourth transistor brings the potential of the systems.

DESCRIPTION OF DRAWINGS

The drawings described herein are for illustrative purposes only of selected configurations and are not intended to limit the scope of the present disclosure.

DETAILED DESCRIPTION OF PREFERRED EMBODIMENTS

A power distribution box having a wake-up circuit for initiating a wake-up signal from a system basis chip to wake up a microcontroller from a sleeping state is provided. The wake-up circuit combines an input from two different sources into a single input of the three available inputs of the system basis chip to wake up a microcontroller. In one aspect, the power distribution box is configured to receive a signal from a first electric device and a second electric device of an automotive vehicle. The wake-up circuit includes a first source input and a second source input. The first source input is connected to the first electric device and the first input. The first source input is configured to receive a pulsed signal from the actuation of the first electric device and transmit the pulsed signal to the first input. The second source input is connected to the second electric device and the first input, and is configured to receive a signal from the actuation of the second electric device. The wake-up circuit further includes a first conversion unit and a second conversion unit. The first conversion unit is interposed between the second source input and the first input. The first conversion unit is configured to process the signal from the second electric device to ground the potential of the system basis chip, changing the potential of the system basis chip wherein the system basis chip transmits the wake-up signal. The second conversion unit is interposed between the first source input and the first input. The second conversion unit is configured to process the pulsed signal from the first electric device and ground the voltage potential for a period of time defined by a discharge rate of a first capacitor. The change of the potential of the system basis chip causes the system basis chip to transmit the wake-up signal.

Figure 1:
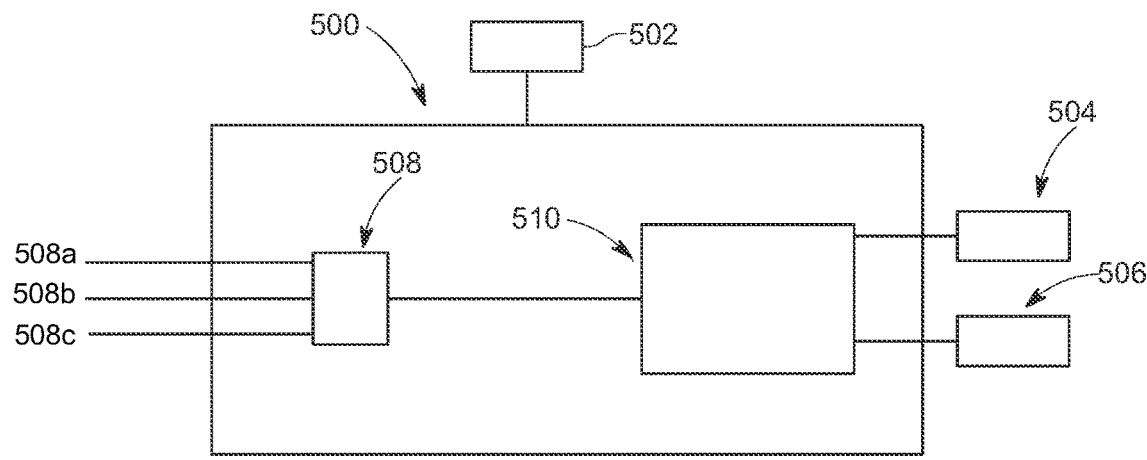
FIG. 1 is a schematic view of a conventional power distribution box.
Figure 2:
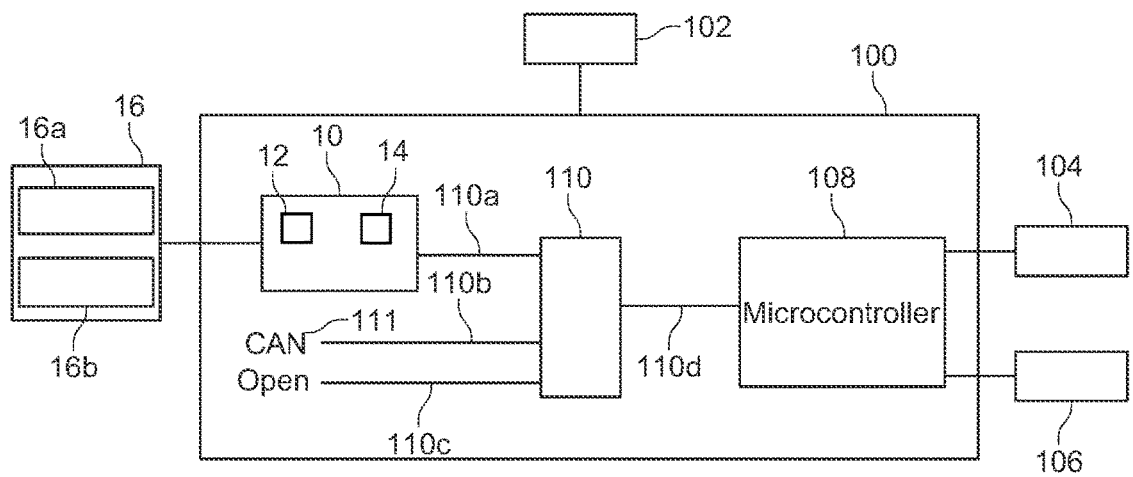
FIG. 2 is a schematic view of a power distribution box according to one or more aspects described herein.
Figure 3:
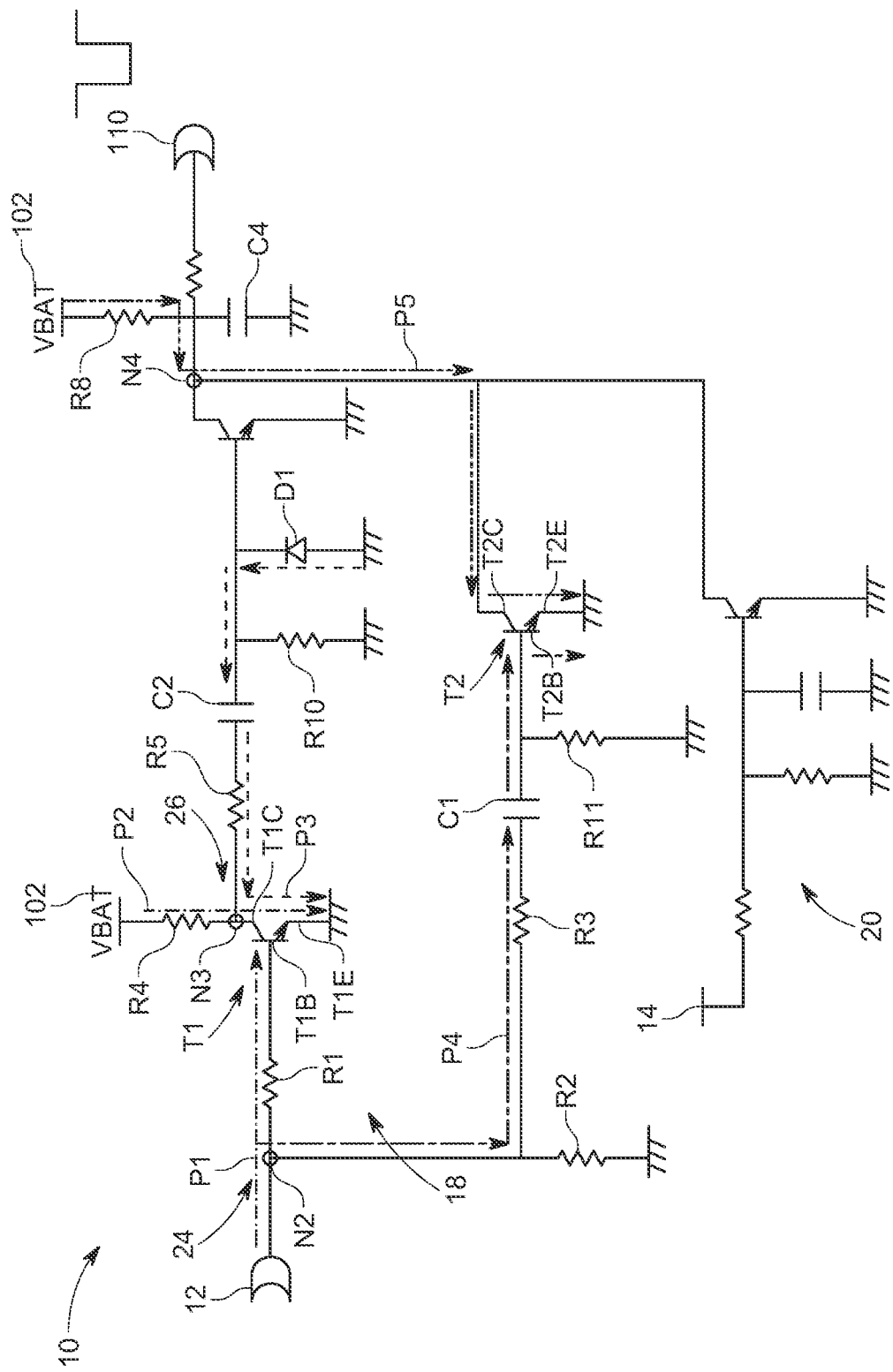
FIG. 3 is an illustrative schematic view of the wake-up circuit shown in FIG. 2, showing the second electric device operating.
Figure 4:
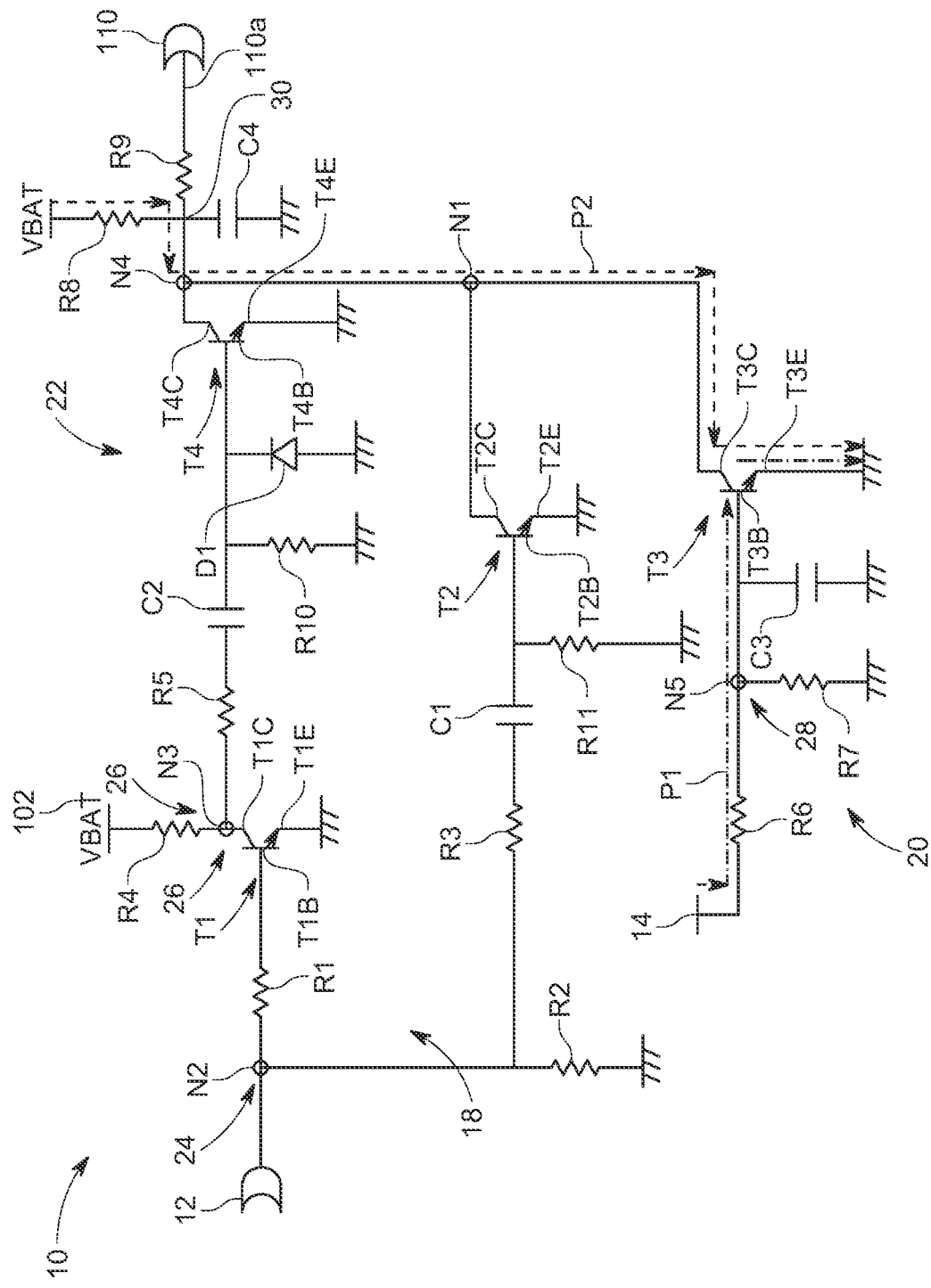
FIG. 4 is an illustrative schematic view of the wake-up circuit shown in FIG. 2, showing the first electric device operating.

With reference now to FIGS. 2-4, an illustrative depiction of a wake-up circuit 10 is provided. The wake-up circuit 10 may be disposed in a power distribution box 100. The power distribution box 100 is configured to supply power from a battery 102 to various electric devices. For illustrative purposes, a discussion of the wake-up circuit 10 will be made in the context of a power distribution box 100 disposed in an automotive vehicle wherein the power distribution box 100 is configured to supply power to a first electric device 104 and a second electric device 106.

The power distribution box 100 includes a microcontroller 108 configured to, among other things, help regulate and control the supply of power from the battery 102 to the first and second electric devices 104, 106. As is known to those skilled in the art, the microcontroller 108 is configured to enter a sleep state after a predetermined period of inactivity. Entering a sleep state is beneficial from the standpoint of battery 102 conservation as the microcontroller 108 is not consuming power. The power distribution box 100 further includes a system basis chip 110 configured to, among other things, transmit a wake-up signal to the microcontroller 108 to wake up the microcontroller 108 from a sleep state.

The system basis chip 110 includes a first input 110*a* configured to receive a signal to actuate a first electric device 104 and a second electric device 106. The system basis chip 110 also includes a second input 110*b* for receiving messages from a Controller Area Network 111 (CAN 111), and a third input 110*c* is left open and available for a fourth input. An output 110*d* is configured to transmit the wake-up signal to the microcontroller 108. The signals are processed by the system basis chip 110 to transmit a wake-up signal to wake up the microcontroller 108 from a sleep state. The system basis chip 110 has a voltage potential, wherein the system basis chip 110 sends the wake-up signal to the microcontroller 108 when a change in the voltage potential of the system basis chip 110 occurs. For illustrative purposes, the voltage potential of the system basis chip 110 is set by the voltage of the battery 102, and the system basis is programmed to transmit the wake-up signal when the voltage potential is drained, e.g. goes from high to low.

The wake-up circuit 10 includes a first source input 12 and a second source input 14. The first source input 12 and the second source input 14 are connected to at least one input 16 (such as a button or key fob) for actuating the first electric device 104 and the second electric device 106, respectively. For context, the input 16 may be a key fob having multiple buttons, one of which is a first button 16*a* for actuating a horn and another is a second button 16*b* for starting the vehicle. In an implementation, the first button 16*a* and the second button 16*b* may be located on separate devices (e.g. the first button 16*a* may be located on a key fob, and the second button 16*b* may be located in a mobile application on a cell phone). The first source input 12 and the second source input 14 are configured to receive a signal from the input 16, wherein power is connected to the first electric device 104 and the second electric device 106, as the case may be.

The wake-up circuit 10 further includes a first conversion unit 18 and a second conversion unit 20. The first conversion unit 18 is connected to the second conversion unit 20 at a first node (N1). The first conversion unit 18 is interposed between the first source input 12 and the first input 110*a*. The first conversion unit 18 is configured to process the pulsed signal from the first source input 12 to ground the potential of the system basis chip 110, changing the potential of the system basis chip 110 and causing the system basis chip 110 to transmit the wake-up signal to wake-up the microcontroller 108. The second conversion unit 20 is interposed between the second source input 14 and the first input 110*a*. The second conversion unit 20 is configured to process the signal from the second source input 14 to ground the potential of the system basis chip 110, changing the voltage potential of the system basis chip 110 wherein the system basis chip 110 transmits the wake-up signal. In both cases, the change in the voltage potential is from high to low, as is known to those skilled in the art.

The wake-up circuit 10 may further include a state determination circuit 22 configured to determine if the first electric device 104 is stuck in an ON position and reset the system basis chip 110 if the first electric device 104 is stuck in an ON position. The state determination circuit 22 is further configured to change the potential of the system basis chip 110 by transmitting a pulse when the first electric device 104 is stuck in the ON position so as to change the voltage potential of the system basis chip 110 from high to low and back to high. In other words, the voltage potential of the system basis chip 110 is drained to ground and then is allowed to store electrical energy to assume the high voltage potential.

The first conversion unit 18 may include a first transistor (T1), a first capacitor (C1), a second transistor (T2), and a second capacitor (C2). The first conversion unit 18 is configured to process the pulsed signal from the input 16 via the first source input 12 to turn on the second transistor (T2) and ground the voltage potential of the battery 102 for a period of time defined by a discharge rate of the first capacitor (C1). The first transistor (T1) is illustratively shown as being an NPN transistor and includes a base (T1B), a collector (T1D), and an emitter (T1E). The base (T1B) is electrically coupled to the first source input 12 so as to receive the pulsed signal. The collector (T1C) is coupled to the battery 102 and the second capacitor (C2) at a third node (N3). The emitter (T1E) is coupled to ground. Accordingly, when the first transistor (T1) is turned on, the battery 102 and the second capacitor (C2) are discharged to ground.

The second transistor (T2) is illustratively shown as being an NPN transistor. The base (T2B) of the second transistor (T2) is coupled to first capacitor (C1), the collector (T2C) of the second transistor (T2) is coupled to the first node (N1) and the emitter (T2E) of the second transistor (T2) is coupled to ground. The second capacitor (C2) is charged by the pulsed signal and turns off the second transistor (T2) sending the voltage potential of the system basis chip 110 to ground for the period of time it takes to discharge the second capacitor (C2), wherein the system basis chip 110 transmits the wake-up signal. In particular, the pulsed signal from the first input 110*a* is sufficient to turn on the first transistor (T1), wherein current and voltage from the battery 102 and the second capacitor (C2) are grounded. The pulse signal is split at a second node (N2) so as to charge the first capacitor (C1). The first capacitor (C1) is charged and is subsequently discharged so as to turn on the second transistor (T2), bringing the voltage potential of the system basis chip 110 to ground so as to change the voltage potential of the system basis chip 110 and cause the system basis chip 110 to transmit the wake-up signal.

The first conversion unit 18 may further include a first voltage divider 24 and a second voltage divider 26. The first voltage divider 24 disposed on the second node (N2), the second voltage divider 26 is disposed on a third node (N3). The second node (N2) is interposed between the first source input 12 and the first transistor (T1) and the third node (N3) is interposed between the first transistor (T1) and the first input 110*a*. The first voltage divider 24 includes a first resistor (R1) and a second resistor (R2) connected in parallel with each other at the second node (N2). The first voltage divider 24 may further include a third resistor (R3) connected in parallel with the second resistor (R2) and disposed between the first capacitor (C1) and the second node (N2). The second voltage divider 26 includes a fourth resistor R4 and a fifth resistor R5 connected in parallel to each other at the third node (N3). The fifth resistor R5 is interposed between the third node (N3) and the second capacitor (C2) so as to limit the current flowing to the second capacitor (C2).

The second conversion unit 20 may include a third transistor (T3) interposed between the second source input 14 and the first node (N1). The third transistor (T3) may be an NPN transistor and includes a base (T3B), a collector (T3C) and an emitter (T3E). The base (T3B) is connected to the second input 110b along an electric line. The collector (T3C) is connected to the first node (N1) and the emitter (T3E) is connected to ground. The collector (T3C) receives power from the battery 102, accordingly when the second transistor (T2) is turned off, the voltage potential of the system basis chip 110 is the same as the voltage of the battery 102. When the third transistor (T3) is turned on, the voltage potential of the system basis chip 110 is grounded.

The second conversion unit 20 may further include a third voltage divider 28 interposed between the second source input 14 and the third transistor (T3). The third voltage divider 28 includes a sixth resistor (R6) and a seventh resistor (R7) connected to each other in parallel at a fifth node (N5). The second conversion unit 20 may further include a third capacitor (C3) connected in parallel with both the third transistor (T3) and the third voltage divider 28. The third capacitor (C3) is configured to filter noise from reaching the third transistor (T3).

In yet another aspect of the disclosure, the state determination circuit 22 may further include a fourth transistor (T4) connected in parallel with the first conversion unit 18 and the second conversion unit 20. The fourth transistor (T4) is disposed at a fourth node (N4), wherein a base (T4B) of the fourth transistor (T4) is connected to the third node (N3) so as to receive a discharge from the second capacitor (C2). The collector (T4C) of the fourth transistor (T4) is connected to the fourth node (N4), which is configured to have the same voltage potential as the system basis chip 110. The emitter (T4E) of the fourth transistor (T4) is connected to ground. In such an aspect, the fourth transistor (T4) brings the voltage potential of the system basis chip 110 to ground for a period of time defined by the discharge of the second capacitor (C2). As the fourth transistor (T4) is turned off after the second capacitor (C2) has completed discharging, the system basis chip 110 is charged to the voltage potential of the battery 102. Consequently, the second capacitor (C2) is emptied, resetting the wake-up circuit 10 to receive the pulse signal from the second source input 14.

A power distribution box 100 is also provided. The power distribution box 100 is disposed in an automotive vehicle (not shown) having a first electric device 104 and a second electric device 106 electrically coupled to a battery 102 having a voltage of 12 volts. For illustrative purposes, the first electric device 104 is a horn and the second electric device 106 is an ignition switch. The power distribution box 100 includes a microcontroller 108 configured to regulate power from the battery 102 to the first electric device 104 and the second electric device 106. The microcontroller 108 is further configured to go to sleep after a predetermined period of inactivity.

The power distribution box 100 further includes a system basis chip 110 configured to transmit a wake-up signal to wake the microcontroller 108. The system basis chip 110 includes a first input 110a, a second input 110b, and a third input 110c. The system basis chip 110 is configured to have a voltage potential equal to the voltage of the battery 102. The system basis chip 110 is further configured to transmit the wake-up signal when the voltage potential changes. For illustrative purposes, the system basis chip 110 is configured to transmit the wake-up signal when the voltage potential changes from high to low, or is otherwise grounded, e.g. from 12 volts to 0 volts.

The power distribution box 100 further includes a wake-up circuit 10. The wake-up circuit 10 includes a first source input 12 and a second source input 14. The wake-up circuit 10 is configured to combine signal from an input 16 to actuate the first electric device 104 and the second electric device 106 so as to free up one of the inputs (110a, 110b, 110c) of the system basis chip 110. As shown in FIG. 2, the input 16, 16a, and 16b of the first electric device 104 and the second electric device 106 are combined and transmitted to the first input 110a of the system basis chip 110. Messages from the CAN 111 are transmitted to the second input 110b and the third input 110c is left open and is available for a fourth input.

The first source input 12 and the second source input 14 are configured to receive a signal from the input 16, for example a device such as a key FOB, wherein the signal is processed to actuate the first electric device 104. In one aspect, the signal transmitted from the first source input 12 is a pulsed signal. The first source input 12 is connected to the first input 110a so as to transmit the pulsed signal from the first source input 12 to the first input 110a. The second source input 14 is also configured to transmit a signal to the first input 110a.

The wake-up circuit 10 further includes a first conversion unit 18 and a second conversion unit 20. The first conversion unit 18 is connected to the second conversion unit 20 at a first node (N1). The first conversion unit 18 is interposed between the first source input 12 and the first input 110a. The first conversion unit 18 is configured to process the pulsed signal from the first source input 12 to ground the potential of the system basis chip 110, changing the potential of the system basis chip 110 and causing the system basis chip 110 to transmit the wake-up signal to wake up the microcontroller 108 from an inactive state.

With reference now to FIG. 3, a description of the operation of the first conversion unit 18 is provided. The dashed arrows indicate the electrical path of the pulsed signal. The first conversion unit 18 processes the pulsed signal to change the voltage potential of the system basis chip 110 from high to low, e.g. ground the voltage potential, wherein the system basis chip 110 transmits the wake-up signal. Further, the first conversion unit 18 is configured to return the voltage potential of the system basis chip 110 to high.

The second conversion unit 20 is interposed between the second source input 14 and the first input 110a. The second conversion unit 20 is configured to process the signal from the second electric device 106 to ground the voltage potential of the system basis chip 110, changing the voltage potential of the system basis chip 110. As the voltage potential of the system basis chip 110 changes, the system basis chip 110 transmits the wake-up signal.

As seen in FIG. 4, the second conversion unit 20 grounds the voltage potential of the system basis chip 110 wherein the voltage potential of the system basis chip 110 remains low, e.g. 0 volts. In particular, the dashed arrow (P1) shows the electrical path of the signal from the second source input 14. The signal may be a 12 volt signal wherein the current is transmitted to the base (T3B) of the third transistor (T3), turning on the third transistor (T3). When the third transistor (T3) is turned on, the voltage potential of the system basis chip 110 is grounded along the electrical path indicated by the dashed arrow (P2).

The wake-up circuit 10 may further include a state determination circuit 22 configured to determine if the first electric device 104 is stuck in an ON position and reset the system basis chip 110 if the first electric device 104 is stuck in an ON position. The state determination circuit 22 is further configured to change the potential of the system basis chip 110 by transmitting a pulse signal when the first electric device 104 is stuck in the ON position so as to change the voltage potential of the system basis chip 110 from high to low and back to high, e.g. from 12 volts to 0 volts and back to 12 volts.

Figure 5:
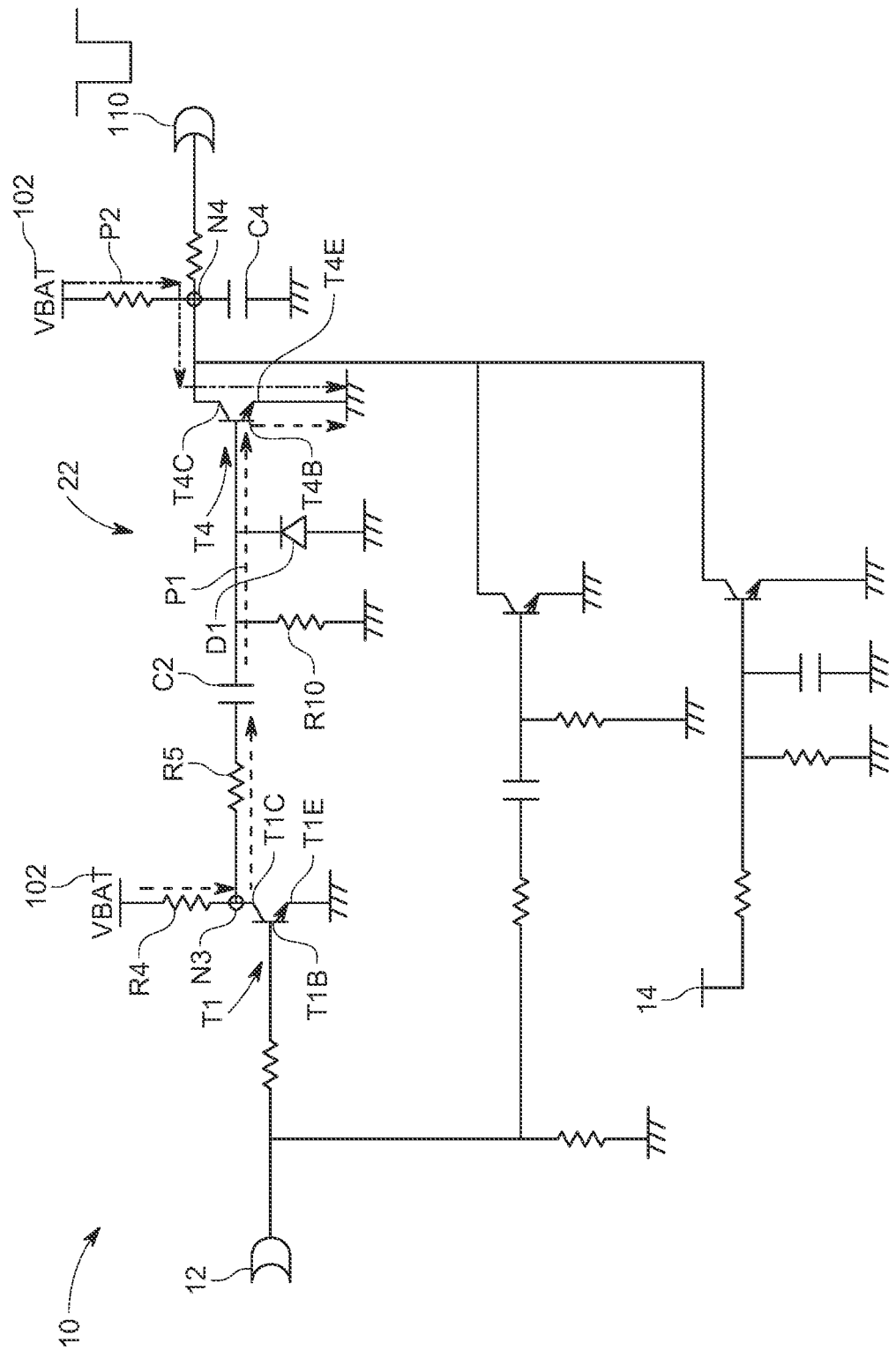
FIG. 5 is an illustrative schematic view of the wake-up circuit shown in FIG. 2, showing the state determination circuit operating.

With reference now to FIG. 5, when the pulsed signal is transmitted from the first source input 12, the first transistor (T1) is temporarily turned on, and then turns off once the pulse signal is processed. FIG. 5 shows a state when the pulsed signal has been processed. When the first transistor (T1) is turned off, the voltage potential of the battery 102 at the third node (N3) charges the second capacitor (C2), as indicated by the dashed arrow (P1). Once the second capacitor (C2) is fully charged, the second capacitor (C2) discharges to the base (T4B) of the fourth transistor (T4), turning on the fourth transistor (T4) which grounds the voltage potential of the system basis chip 110 as indicated by the dashed arrow (P2), e.g. changes the voltage potential of the system basis chip 110 from high to low, wherein once the second capacitor (C2) is discharged, the fourth transistor (T4) is turned off allowing the voltage potential of the system basis chip 110 to equal that of the battery 102, e.g. changes the voltage potential of the system basis chip 110 from low to high.

It should be appreciated that a fourth voltage divider 30 may be interposed between the fourth node (N4) and the first input (110*a*) of the system basis chip 110, wherein the fourth voltage divider 30 includes an eighth resistor (R8) and a ninth resistor (R9) connected in parallel with each other. The eighth resistor (R8) and the ninth resistor (R9) may have a value of 10 kΩ. The fourth voltage divider 30 is configured to limit the current to the system basis chip 110. A fourth capacitor (C4) may also be connected in parallel with the fourth voltage divider 30 and grounded. The fourth capacitor (C4) is configured to filter noise from entering the system basis chip 110. The state determination circuit 22 may further include a tenth resistor (R10) and a diode (D1) connected in parallel with each other and interposed between the second capacitor (C2) and the fourth transistor (T4). The tenth resistor (R10) may have a value of 5.6 kΩ and the diode (D1) may be configured to handle the charge of the second capacitor (C2) when the first transistor (T1) is turned on so as to protect the second capacitor (C2) from damage.

With reference again to FIG. 3, an operation of the first conversion unit 18 is provided. The first conversion unit 18 is configured to process the pulsed signal from the first electric device 104 via the first source input 12 to turn on the second transistor (T2) as indicated by the dashed arrow (P1). When the second transistor (T2) is turned on, the voltage potential of the battery 102 at the third node (N3) is grounded, as indicated by the dashed arrow (P2)

The second capacitor (C2) has a value of 0.20 microfarads and is also discharged to ground, as indicated by the dashed arrow (P3). The pulse signal is divided at the second node (N2) and charges the first capacitor (C1), which has a value of 47 nanofarads, as indicated by the dashed arrow (P4). The first transistor (T1) is illustratively shown as being an NPN transistor and includes a base (T1B), a collector (T1C), and an emitter (T1E). The base (T1B) is electrically coupled to the first source input 12 so as to receive the pulsed signal. The collector (T1C) is coupled to the battery 102 and the second capacitor (C2) at a third node (N3). The emitter (T1E) is coupled to ground. Accordingly, when the first transistor (T1) is turned on, the voltage potential of the system basis chip 110 (as indicated by the voltage at the fourth node (N4)) and the second capacitor (C2) are discharged to ground as indicated by dashed arrows (P4) and (P5). Once the voltage potential of the system basis chip 110 is drained, the system basis chip 110 goes from a high signal to a low signal output. Once the first capacitor (C1) is discharged and the current stops flowing to the first transistor (T1), the first transistor (T1) is turned off, wherein the voltage potential of the system basis chip 110 is increased to the voltage potential of the battery 102 at the fourth node (N4).

The first conversion unit 18 may further include a first voltage divider 24 and a second voltage divider 26. The first voltage divider 24 disposed on the second node (N2), the second voltage divider 26 is disposed on the third node (N3). The second node (N2) is interposed between the first source input 12 and the first transistor (T1) and the third node (N3) is interposed between the first transistor (T1) and the first input 110*a*. The first voltage divider 24 includes a first resistor (R1) having a value of 47 kΩ and a second resistor (R2) having a value of 47 kΩ connected in parallel with each other at the second node (N2). The first voltage divider 24 may further include a third resistor (R3) having a value of 10 kΩ connected in parallel with the second resistor (R2) and disposed between the first capacitor (C1) and the second node (N2).

The second voltage divider 26 includes a fourth resistor R4 having a value of 15 kΩ and a fifth resistor R5 having a value of 12 kΩ connected in parallel to each other at the third node (N3). The fifth resistor R5 is interposed between the third node (N3) and the second capacitor (C2) so as to limit the current flowing to the second capacitor (C2). The voltage dividers 24, 26 are configured to limit the current to the respective first transistor (T1), first capacitor (C1), and second capacitor (C2). In one aspect, the first conversion unit 18 includes an eleventh resistor (R11) connected in parallel with the first capacitor (C1) and the second transistor (T2), wherein the eleventh resistor (R11) is interposed between the first capacitor (C1) and the second transistor (T2). The eleventh resistor (R11) is configured to divide the voltage to the second transistor (T2) and may have a value of 4.7 kΩ.

The second conversion unit 20 may include a third transistor (T3) interposed between the second source input 14 and the first node (N1). The third transistor (T3) may be an NPN transistor and includes a base (T3B), a collector (T3C) and an emitter (T3E). The base (T3B) is connected to the second input 110*b* along an electric line. The emitter (T3E) is connected to ground. The collector (T3C) is connected to the first node (N1) so as to receive power from the battery 102, accordingly when the second transistor (T2) is turned off, the voltage potential of the system basis chip 110 is the same as the voltage of the battery 102. When the third transistor (T3) is turned on, the voltage potential of the system basis chip 110 is grounded.

With reference again to FIG. 4, an operation of the second conversion unit 20 is provided. The second conversion unit 20 may further include a third voltage divider 28 interposed between the second source input 14 and the third transistor (T3). The third voltage divider 28 includes a sixth resistor (R6) having a value of 10 kΩ and a seventh resistor (R7) having a value of 10 kΩ connected to each other in parallel at a fifth node (N5). The second conversion unit 20 may further include a third capacitor (C3) having a value of 0.20 microfarads connected in parallel with both the third transistor (T3) and the third voltage divider 28. The third capacitor (C3) is configured to filter noise from reaching the third transistor (T3).

As shown, the second source input 14 provides a signal having 12 volts which is transmitted to the base (T3B) of the third transistor (T3) as indicated by dashed arrow (P1). The current is split at the third voltage divider 28, and noise in the signal is filtered by the third capacitor (C3) before reaching the third transistor (T3), turning the third transistor (T3) on. In the case where the second electric device 106 is an ignition switch, a current is continuously applied to the third transistor (T3), keeping the third transistor (T3) on. As the third transistor (T3) is on, the voltage potential at the fourth node (N4) is grounded, as indicated by the dashed arrow (P2). Accordingly, the voltage potential of the system basis chip 110 goes from high to low and remains in a low state, e.g. ground, until the ignition switch is turned off, in which case no current is transmitted to the third transistor (T3) and the third transistor (T3) is turned off.

With reference now to FIG. 5, an operation of the state determination circuit 22 is provided. The state determination unit may further include a fourth transistor (T4) disposed at a fourth node (N4) so as to be connected in parallel with the first conversion unit 18 and the second conversion unit 20. The fourth transistor (T4) is an NPN transistor. A base (T4B) of the fourth transistor (T4) is connected to the third node (N3) so as to receive a discharge from the second capacitor (C2), which turns on the fourth transistor (T4) as indicated by dashed arrow (P1). The collector (T4C) of the fourth transistor (T4) is connected to the fourth node (N4), which is configured to have the voltage potential of the system basis chip 110. The emitter (T4E) of the fourth transistor (T4) is connected to ground. In such an aspect, the fourth transistor (T4) brings the voltage potential of the system basis chip 110 to ground as indicated by the dashed arrow (P2), wherein the system basis chip 110 transmits a wake-up signal. Once the second capacitor (C2) is discharged, no current is transmitted to the fourth transistor (T4), turning the fourth transistor (T4) off, in which case the voltage potential of the system basis chip 110 is returned to 12 volts, e.g. high and the second capacitor (C2) remains discharged.

It should be appreciated that the value and construction of the known elements, such as the resistors, capacitors and transistors, are beyond the scope of the disclosure and such components may be modified and adapted for use herein based the operating conditions of the system, e.g. the voltage of the battery 102, the current and voltage thresholds of the system basis chip 110, the microcontroller 108 and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A wake-up circuit disposed in a power distribution box, the power distribution box including a system basis chip for waking up a microcontroller from an inactive state, the microcontroller powered by a battery, the system basis chip including a first input, a second input and a third input, wherein the system basis chip includes a voltage potential, the system basis chip sends a wake up signal to the microcontroller when a change in the voltage potential occurs, the wake up circuit comprising:
a first source input configured to receive a pulsed signal for actuating a first electric device and transmit the pulsed signal to the first input;
a second source input configured to receive a signal for actuating a second electric device and transmit the signal to the first input;
a first conversion unit interposed between the first source input and the first input, the first conversion unit configured to process the pulsed signal from the first electric device and ground the voltage potential for a period of time, changing the voltage potential of the system basis chip wherein the system basis chip transmits the wake-up signal; and
a second conversion unit interposed between the second source input and the first input, the second conversion unit configured to process the signal from the second electric device to ground the voltage potential of the system basis chip, changing the voltage potential of the system basis chip wherein the system basis chip transmits the wake-up signal.

2. The wake-up circuit set forth in claim 1, wherein the first conversion unit is connected to the second conversion unit at a first node.

3. The wake-up circuit set forth in claim 2, further including a state determination circuit configured to determine if the first electric device is stuck in an ON position, the state determination circuit further configured to change the voltage potential the system basis chip by transmitting a pulse when the first electric device is stuck in the ON position.

4. The wake-up circuit as set forth in claim 2, wherein the first conversion unit includes a first transistor, a first capacitor, a second transistor and a second capacitor, the first transistor interposed between the first source input and the first input, the first conversion unit configured to process a pulsed signal from the first electric device to turn on the second transistor and ground the voltage potential of the battery for a period of time defined by a discharge rate of the first capacitor, wherein the second capacitor is charged turning off the second transistor sending the voltage potential of the system basis chip to ground for the period of time.

5. The wake-up circuit as set forth in claim 4, wherein the first conversion unit further includes a first voltage divider and a second voltage divider, the first voltage divider disposed on a second node, the second node interposed between the first source input and the first transistor, the second voltage divider disposed on a third node, the third node interposed between the first transistor and the first input.

6. The wake-up circuit as set forth in claim 2, wherein the second conversion unit includes a third transistor interposed between the second source input and the first node.

7. The wake-up circuit as set forth in claim 6, further including a third voltage divider interposed between the second source input and the third transistor.

8. The wake-up circuit as set forth in claim 7, further including a third capacitor disposed in parallel with the third transistor and the third voltage divider.

9. The wake-up circuit as set forth in claim 8, wherein the state determination circuit includes a fourth transistor connected in parallel with the first conversion unit and the second conversion unit disposed at a fourth node, wherein a base of the fourth transistor is connected to the first source input.

10. The wake-up circuit as set forth in claim 9, wherein the fourth transistor brings the voltage potential of the system basis chip to ground so as to allow the battery to charge the third capacitor.

11. A power distribution box, the power distribution box disposed in an automotive vehicle having a first electric device and a second electric device electrically coupled to a battery, the power distribution box comprising:
 a microcontroller configured to go to sleep after a predetermined period of inactivity;
 a system basis chip including a first input, a second input and a third input, the system basis chip having a voltage potential and configured to transmit a wake-up signal to the microcontroller when a change in the voltage potential occurs;
 a wake-up circuit including a first source input, a second source input, a first conversion unit and a second conversion unit, the first source input is configured to receive a pulsed signal for actuating the first electric device and transmit the pulsed signal to the first input, the second source input is configured to receive a signal for actuating the second electric device and transmit the signal to the first input; wherein
 the first conversion unit is interposed between the first source input and the first input, the first conversion unit configured to process the pulsed signal and ground the voltage potential for a period of time, changing the voltage potential of the system basis chip to wake up the system basis chip; and wherein
 the second conversion unit is interposed between the second source input and the first input, the second conversion unit configured to process the signal to ground the voltage potential of the system basis chip, changing the voltage potential of the system basis chip to wake up the system basis chip.

12. The power distribution box set forth in claim 11, wherein the first conversion unit is connected to the second conversion unit at a first node.

13. The power distribution box set forth in claim 12, further including a state determination circuit configured to determine if the first electric device is stuck in an ON position, the state determination circuit further configured to change the voltage potential of the system basis chip by transmitting a pulse when the first electric device is stuck in the ON position.

14. The power distribution box as set forth in claim 12, wherein the first conversion unit includes a first transistor, a first capacitor, a second transistor and a second capacitor, the first transistor interposed between the first source input and the first input, the first conversion unit configured to process the pulsed signal from the first electric device to turn on the second transistor to ground the voltage potential of the battery for a period of time defined by a discharge rate of the first capacitor, wherein the second capacitor is charged turning off the second transistor sending the voltage potential of the system basis chip to ground for the period of time.

15. The power distribution box as set forth in claim 14, wherein the first conversion unit further includes a first voltage divider and a second voltage divider, the first voltage divider disposed on a second node, the second node interposed between the first source input and the first transistor, the second voltage divider disposed on a third node, the third node interposed between the first transistor and the first input.

16. The power distribution box as set forth in claim 12, wherein the second conversion unit includes a third transistor interposed between the second source input and the first node.

17. The power distribution box as set forth in claim 16, further including a third voltage divider interposed between the second source input and the third transistor.

18. The power distribution box as set forth in claim 17, further including a third capacitor disposed in parallel with the third transistor and the third voltage divider.

19. The power distribution box as set forth in claim 18, wherein the state determination circuit includes a fourth transistor connected in parallel with the first conversion unit and the second conversion unit disposed at a fourth node, wherein a base of the fourth transistor is connected to the first source input.

20. The power distribution box as set forth in claim 19, wherein the fourth transistor brings the voltage potential of the system basis chip to ground so as to allow the battery to charge the third capacitor.

* * * * *